June 25, 1957 R. A. RATCLIFF 2,796,651
HOIST HOOK SAFETY GATE
Filed June 17, 1954
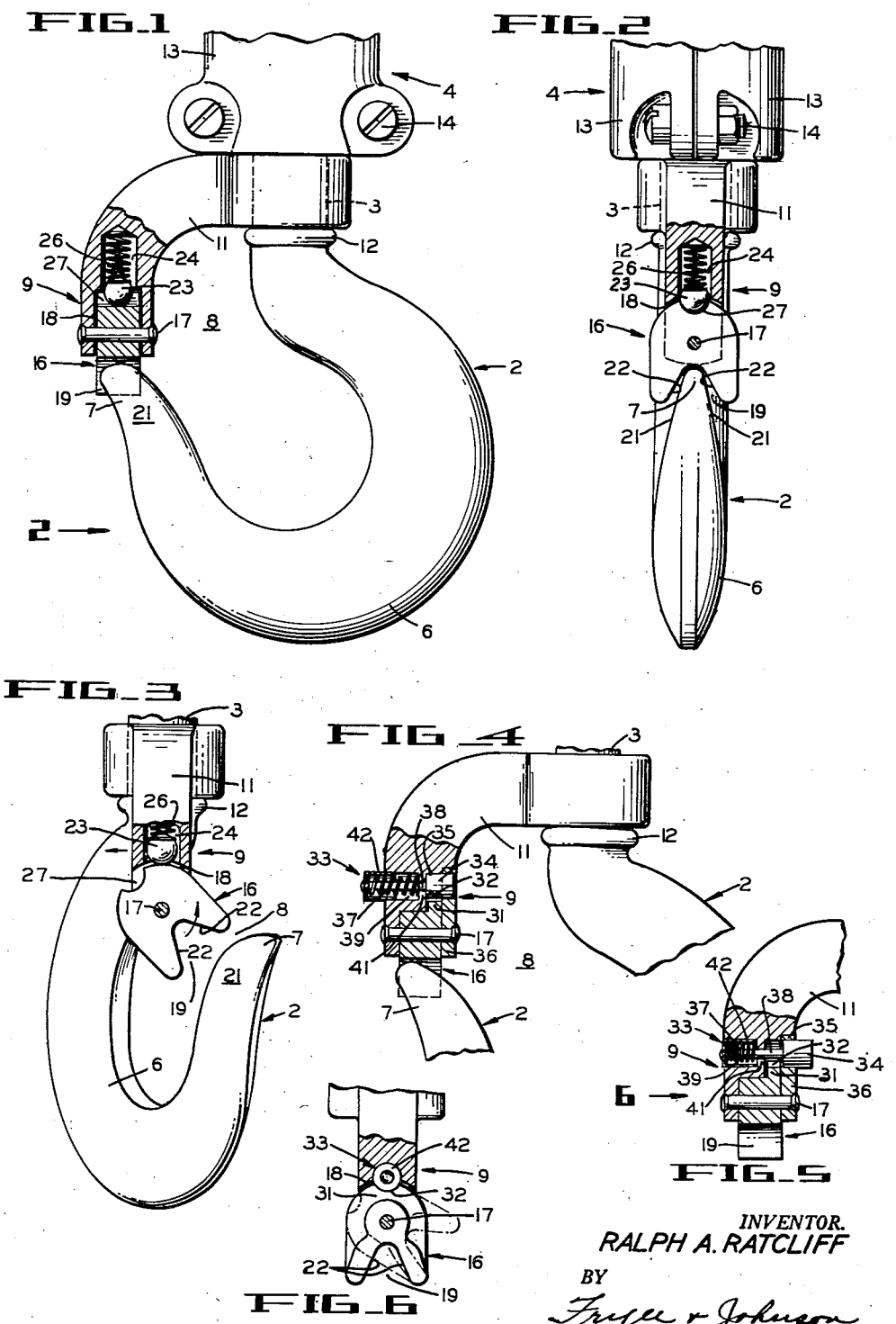
INVENTOR.
RALPH A. RATCLIFF
BY
Fryer & Johnson
ATTORNEYS ically.
United States Patent Office 2,796,651
Patented June 25, 1957

2,796,651

HOIST HOOK SAFETY GATE

Ralph A. Ratcliff, Belmont, Calif.

Application June 17, 1954, Serial No. 437,513

8 Claims. (Cl. 24—241)

This invention relates to hoist hooks of the conventional C-hook type; and more particularly to a safety gate structure for such hooks. Although hoist hooks of the C-type have heretofore been provided with safety gates to close the throat opening between the tip end of the hook and the shank, such prior constructions are not all to be desired with respect to simplicity, ease of operation, and positive closure of the throat opening.

Summarizing this invention, it comprises an improved safety gate structure which is provided at the end thereof adjacent the tip of the hook, with a recessed latching cap portion for receiving and covering the hook tip in the closed position of the gate, so as to preclude any possibility of a line supported on the hook from escaping between the gate and the hook tip. At its opposite end, the gate structure is journalled for turning movement in either direction about the axis of the shank of the hook; and the latching cap is movably mounted and so constructed as to provide for ready latching or unlatching of the gate upon turning movement of the gate relative to the hook in either direction about the shank of the hook.

From the preceding, it is seen that the invention has as its objects, among others, the provision in a hook assembly of the character related, of an improved quick acting latching gate structure wherein the tip of the hook is positively and completely closed when the gate is in latched position, which is mounted solely on the gate so as not to impair the strength of either the hook or the hook shank, which can be readily and quickly manipulated to latch or unlatch the gate, and which is of simple and economical construction. Referring to the drawings:

Fig. 1 is a side elevational view of a preferred embodiment of the hoist hook assembly of this invention with a portion thereof shown in section to disclose the construction more clearly;

Fig. 2 is a front elevational view looking in the direction of arrow 2 in Fig. 1, with a portion of the construction shown in section;

Fig. 3 is a view similar to Fig. 2 but illustrating the gate structure moved relative to the hook to depict how the gate may be unlatched upon turning thereof relative to the hook;

Fig. 4 is a fragmentary side elevation, partly in section, of a modified construction wherein the latching cap of the device can be positively dogged in the latched position of the gate;

Fig. 5 is a sectional view of the dogging mechanism illustrated in Fig. 4, showing the position it assumes when manually released; and Fig. 6 is an elevational view, partly in section, looking in the direction of arrows 6 in Fig. 5, illustrating in phantom lines the position of the latching cap when unlatched.

With reference to the preferred embodiment of Figs. 1 through 3, the hoist hook assembly comprises a conventional C-hook 2 terminating adjacent one end thereof in shank 3 which is conventionally mounted for turning movement about an upright axis in a conventional support therefor in the form of block 4. Bight portion 6 of the hook integral with shank 3, terminates adjacent the opposite end of the hook in tip end 7 which is spaced from the shank to provide a relatively wide throat opening 8.

A hoist line (not shown) is adapted to be held on the bight of the hook when inserted past the throat opening 8; and the safety gate structure 9 of this invention is provided for fully and positively closing such throat opening when the line is engaged on the hook for hoisting. The safety gate structure comprises an elbow member 11 which is generally L-shaped, and which is journalled at one end thereof for turning movement in either direction about shank 3; the journalled portion of the elbow being formed with a cylindrical aperture through which the shank projects freely and being held between a flange 12 on the shank and block 4. In this connection, block 4 is formed of the usual mating half sections 13 to permit assembly of the shank therein in the usual manner; and which are detachably held together by bolts and nuts 14.

The end of elbow 11 opposite the journalled portion extends downwardly to a position directly over tip 7 in the closed position of the gate; and on such end is a latching cap 16 pivotally mounted for movement in either one of opposite directions on a horizontal pivot pin 17, the axis of which extends transversely at a right angle, to the upright turning axis of elbow 11 on the shank. The upper portion of cap 16 is movable in a recess 18 formed in the lower end of elbow 11, while the lower part of cap 16 projects below the lower end of elbow 11 and is formed with a bottom recess 19 which is adapted, in the closed position of the gate, to receive tip 7 of the hook with the opposite sides 21 of tip 7 embraced by the cap, and thus positively cover the hook tip to prevent escape of the line in the closed position of the gate.

Recess 19 is of an inverted V-shape to thus form inwardly converging, slanting opposite sides 22; and the opposite sides 21 of the hook adjacent tip 7 are also slanted inwardly; the top end of tip 7 being rounded. As a result of the slanting sides 22 of cap recess 19 and slanting sides 21 of the hook, cam surfaces are provided. Hence, when elbow 11 is manually turned in either direction relative to the hook from the closed position of the gate shown in Fig. 2, such cam surfaces permit cap 16 to pivot automatically on its pivot pin mounting 17 to thus allow the gate to open automatically. In a reverse manner, the gate can automatically close when the elbow is moved in an opposite direction from the open position of the gate.

Fig. 3 illustrates how such opening of the gate occurs when elbow 11 is manually turned to the left relative to the hook, from the position shown in Fig. 2. During such opening, right hand surface 21 on the hook (as it appears in Fig. 3) engages the right hand cam surface 22 of recess 19 to cause cap 16 to pivot to the right as the gate is opened, as is indicated by the direction arrow in Fig. 3. Closing of the gate can be readily automatically effected when it is manually moved in the opposite direction from the open position; and when this is done, the left hand surface 21 of the hook engages the left hand cam surface 22 of the cap to cause automatically return movement of the cap to closed position as hook tip 7 enters cap recess 19. In a like manner, the gate can be opened from closed position when moved in an opposite direction from the direction of movement illustrated in Fig. 3, and can be again automatically closed when moved to closed position over the tip of the hook.

Spring pressed latching means is provided for automatically latching cap 16 to elbow 11 in a position over the tip of the hook in the closed position of the gate. Such latching means permits automatic opening of the gate when moved in either direction in the manner previously described. A latching member having a spherical surface, preferably in the form of ball 23, is positioned for up and down movement in a recess 24 in elbow 11; the ball being thrust into engagement with the top end of cap 16 by a coil spring 26. The upper edge of cap 16 is curved and is formed with a recess 27 of a curved shape complementary in shape to the ball 23 so as to permit the ball to enter the same and latch the cap in the position shown in Fig. 2. When the gate is opened from the position shown in Fig. 2, spring 26 yields automatically to allow the ball 23 to leave recess 27 and ride on the curved upper edge of the cap; and when the gate is again closed, the spring automatically thrusts the ball into latching position in recess 27.

From the preceding, it is seen that the gate structure can be quickly and easily opened in either direction of movement relative to the hook, merely by hand movement of the gate relative to the hook as no other manipulatable parts are required to close or open the gate. Because tip 7 of the hook is seated in recess 19 formed in cap 16 in the closed position of the gate, positive and full closure of the throat opening 8 obtains. Also, as can be seen from Figs. 1 and 2, the described arrangement of cap recess 19 into which tip 7 of the hook projects in the closed position of the gate, provides a ready gauge to enable an operator to ascertain whether the hook is sprung from overloading. This is so because should the hook become sprung, the operator will be able to observe that the tip end thereof is not positioned properly with respect to latching cap 16.

In the embodiment of the invention illustrated in Figs. 4 through 6, the arrangement is essentially the same as the preferred embodiment except that manually releasable means is provided not only to latch the gate in its closed position over the hook, but to dog it also. Since the construction is otherwise essentially the same as that previously described, the same reference characters are applied to the common parts. For effecting the dogging, the upper edge of cap 16 is formed with a flange 31 at one side, and a dogging recess 32 is formed in this flange.

A spring pressed dogging pin 33 is slidably mounted in elbow 11 along an axis extending in the same direction and parallel to the axis of the latching cap pivot pin 17. Dogging pin 33 is provided at one end thereof with an enlarged cylindrical portion 34 which is slidably piloted in an aperture 35 formed in a plate 36 fixed on elbow 11 by pivot pin 17. Such cylindrical portion 34 engages in dogging recess 32 in the dogged position of cap 16, as is indicated in Fig. 4, and is normally urged to such dogged position by a coil spring 37 about reduced stem 38 of the dogging pin. Spring 37 extends through a cylindrical recess 39 in the elbow, and is interposed between a shoulder 41 in the elbow through which stem 38 can slide, and a cap 42 secured to the outer end of stem 38 and slidable in recess 39.

In the closed position of the gate, indicated in Fig. 4, cylindrical portion 34 of the dogging pin engages in dogging recess 32 and is held in the aperture 35 in plate 36. Hence, cap 16 is positively dogged against movement. To open the gate from the closed position shown in Fig. 4, cap 42 need only be manually depressed and held against the action of spring 37 to cause cylindrical portion 34 to be removed from the recess 32 as indicated in Fig. 5. Then the gate can be opened by manual movement in either direction relative to the hook in the manner previously described.

When the gate is opened, and the finger of the operator is released from cap 42, spring 33 causes the cylindrical portion 34 to engage frictionally against flange 31 to hold cap 16 open in the manner indicated by the phantom lines in Fig. 6, so that it will remain in proper position to allow automatic entrance of tip 7 of the hook into the recess 19 of the cap upon closing of the gate. During such closing of the gate, as soon as dogging recess 32 becomes positioned in line with cylindrical portion 34, spring 37 thrusts such portion into the dogging recess to dog the cap.

From the preceding, it is seen that the described construction functions the same as that of the preferred modification except that the latching cap is automatically dogged in the closed position of the gate, and requires mere manual depression of the dogging means to unlatch the same. It will be noted that in both modifications, since the gate latching means is mounted solely on the gate, the strength of the hook shank and the hook is not impaired, as would otherwise occur by mounting a latching means on such parts.

I claim:

1. A hoist hook assembly comprising a hook having a shank portion adjacent one end for mounting on a support and a bight portion terminating adjacent the opposite end in a tip spaced from said shank to form a throat opening; and a safety gate structure for closing said throat opening including an elbow member journalled at one end thereof on said shank for turning movement about the shank, and a recessed cap pivotally mounted on the opposite end of said elbow about a horizontal axis extending longitudinally of said elbow for receiving and covering said hook tip in the closed position of said gate structure; said cap having an internal cam surface cooperable with a side of the tip enabling said gate structure to become automatically closed or opened upon movement of said elbow.

2. A hoist hook assembly comprising a hook having a shank portion adjacent one end for mounting on a support and a bight portion terminating adjacent the opposite end in a tip spaced from said shank to form a throat opening; and a safety gate structure for closing said throat opening including an elbow member journalled at one end thereof on said shank for turning movement about the axis of the shank in either direction, and a recessed cap pivotally mounted on the opposite end of said elbow about a horizontal axis extending longitudinally of said elbow and transverse to the shank axis for receiving and covering said hook tip in the closed position of the gate structure; the recess in said cap having opposite cam surfaces cooperable with opposite sides of the tip enabling said gate structure to become automatically closed or opened upon movement of said elbow in either direction.

3. A hoist hook assembly comprising a hook having a shank portion adjacent one end for mounting on a support and a bight portion terminating adjacent the opposite end in a tip spaced from said shank to form a throat opening; a safety gate structure for closing said throat opening including an elbow member journalled at one end thereof on said shank for turning movement about the axis of the shank in either direction, and a recessed cap pivotally mounted on the opposite end of said elbow about a horizontal axis extending longitudinally of said elbow and transverse to the shank axis for receiving and covering said hook tip in the closed position of the gate structure; the recess in said cap being V-shaped to provide opposite cam surfaces cooperable with opposite sides of the tip enabling said gate structure to become automatically closed or opened upon movement of said elbow in either direction; and releasable means for latching said cap to said elbow in the closed position of the gate structure.

4. A hoist hook assembly comprising a hook having a shank portion adjacent one end for mounting on a support and a bight portion terminating adjacent the opposite end in a tip spaced from said shank to form a throat opening; a safety gate structure for closing said throat opening including an elbow member journalled at one end thereof on said shank for turning movement about the axis of the shank in either direction, and a recessed cap pivotally mounted on the opposite end of said elbow about a horizontal axis extending longitudinally of said elbow and transverse to the shank axis for receiving and covering said hook tip in the closed position of the gate structure; the recess in said cap being V-shaped to provide opposite cam surfaces cooperable with opposite sides of the tip enabling said gate structure to become automatically closed or opened upon movement of said elbow in either direction; and a spring pressed member movably mounted in said elbow for engaging a recess in said cap to latch said cap to said elbow in the closed position of the gate structure.

5. A hoist hook assembly comprising a hook having a shank portion adjacent one end for mounting on a support and a bight portion terminating adjacent the opposite end in a tip spaced from said shank to form a throat opening; a safety gate structure for closing said throat opening including an elbow member journalled at one end thereof on said shank for turning movement about the axis of the shank in either direction, and a recessed cap pivotally mounted on the opposite end of said elbow about a horizontal axis extending longitudnally of said elbow and transverse to the shank axis for receiving and covering said hook tip in the closed position of the gate structure; the recess in said cap having opposite cam surfaces cooperable with opposite sides of the tip enabling said gate structure to become automatically closed or opened upon movement of said elbow in either direction; and an automatically releasable spring pressed member having a spherical surface for engaging in a complementary recess in said cap for latching said cap to said elbow in the closed position of the gate structure.

6. A hoist hook assembly comprising a hook having a shank portion adjacent one end for mounting on a support and a bight portion terminating adjacent the opposite end in a tip spaced from said shank to form a throat opening; a safety gate structure for closing said throat opening including an elbow member journalled at one end thereof on said shank for turning movement about the axis of the shank in either direction and a recessed cap pivotally mounted on the opposite end of said elbow about a horizontal axis extending longitudinally of said elbow and transverse to the shank axis for receiving and covering said hook tip in the closed position of the gate structure; the recess in said cap being V-shaped to provide opposite cam surfaces cooperable with opposite sides of the tip enabling said gate structure to become automatically closed or opened upon movement of said elbow in either direction; and a manually releasable spring pressed member slidably mounted in said elbow along an axis parallel to said cap pivot axis having a portion for engaging in a recess in said cap to latch the same to said elbow in the closed position of the gate structure.

7. A hoist hook assembly comprising a hook having an upright shank portion adjacent one end for mounting on a support and a bight portion terminating adjacent the opposite end in a tip spaced from said shank to form a throat opening; and a safety gate structure for closing said throat opening including an elbow member journalled at one end thereof on said shank for turning movement in either one of opposite lateral directions about the upright axis of the shank, the opposite end of said elbow overlying said tip in the closed position of said gate structure, and a cap pivotally mounted on said opposite end of the elbow about a horizontal axis extending longitudinally of the elbow and transverse to the shank axis for swinging movement in either one of opposite lateral directions with reference to opposite sides of the tip in said closed position of the gate structure, said cap having a bottom recess for receiving and covering said hook tip in the closed position of the gate structure, the cap recess having opposite cam surfaces cooperable with said opposite tip sides enabling said gate structure to become automatically closed or opened upon movement of said elbow in either one of its directions of lateral movement.

8. A hoist hook assembly comprising a hook having an upright shank portion adjacent one end for mounting on a support and a bight portion terminating adjacent the opposite end in a tip spaced from said shank to form a throat opening; a safety gate structure for closing said throat opening including an elbow member journalled at one end thereof on said shank for turning movement in either one of opposite lateral directions about the upright axis of the shank, the opposite end of said elbow overlying said tip in the closed position of said gate structure, and a cap pivotally mounted on said opposite end of the elbow about a horizontal axis extending longitudinally of the elbow and transverse to the shank axis for swinging movement in either one of opposite lateral directions with reference to opposite sides of the tip in said closed position of the gate structure, said cap having a bottom recess for receiving and covering said hook tip in the closed position of the gate structure; the cap recess having opposite cam surfaces cooperable with said opposite tip sides enabling said gate structure to become automatically closed or opened upon movement of said elbow in either one of its directions of lateral movement; and a spring pressed member movably mounted in the end portion of said elbow overlying said tip for engaging a recess in said cap to latch said cap to said elbow in the closed position of said gate structure.

References Cited in the file of this patent

UNITED STATES PATENTS

| | | |
|---|---|---|
| 48,336 | Frisbie | June 20, 1865 |
| 1,183,059 | Balch | May 16, 1916 |
| 1,723,416 | Finne | Aug. 6, 1929 |
| 2,493,282 | Croswell | Jan. 3, 1950 |
| 2,706,318 | Coffing | Apr. 19, 1955 |
| 2,728,967 | Burnham | Jan. 3, 1956 |